United States Patent [19]

Hong et al.

[11] Patent Number: 4,816,101
[45] Date of Patent: Mar. 28, 1989

[54] PROCESS FOR EXTRUDING A PUNCTURE SEALANT AND FORMING AN ELASTOMERIC LAMINATE

[75] Inventors: Sung W. Hong, Cheshire; Gilles J. Page, Enfield, both of Conn.

[73] Assignee: The Uniroyal Goodrich Tire Company, Akron, Ohio

[21] Appl. No.: 89,791

[22] Filed: Aug. 27, 1987

[51] Int. Cl.$^4$ .................. B29C 47/00; B32B 31/30
[52] U.S. Cl. .................. 156/244.11; 156/244.23; 156/244.24; 152/502; 152/504; 152/505
[58] Field of Search .................. 156/244.11, 244.23, 156/244.24; 152/502, 504, 505; 264/176 R, 211; 427/331, 352

[56] References Cited

U.S. PATENT DOCUMENTS

| | | | |
|---|---|---|---|
| 3,903,947 | 9/1975 | Emerson | 152/504 |
| 4,359,078 | 11/1952 | Egan | 152/205 |
| 4,388,261 | 6/1983 | Codispoti et al. | 152/505 |
| 4,665,963 | 5/1987 | Timar et al. | 152/504 |

*Primary Examiner*—Caleb Weston
*Attorney, Agent, or Firm*—Alfred D. Lobo; John D. Haney

[57] ABSTRACT

A process is disclosed for extruding a flat strip of uniformly thick sealant stock from an extruder which extrudes the sealant stock with a rotary helical action. The stock consists essentially of a vulcanizable mixture of a high molecular weight (mol wt) elastomer, a low mol wt elastomer, a curing agent and a processing aid selected from a tackifier and a homogenizer. The strip is less than about 10 mm thick, and at least 10 times as wide as it is thick. The stock does not flow and cannot be poured even at 212° F. The stock is supplied to the extruder by a reciprocating pump which maintains an intermittent pressure yet provides the required uniform thickness of strip. Each component of the stock strongly adheres to any surface, to all metal surfaces and to each other, making it difficult to obtain a homogeneous mixture. The rate at which the strip is discharged from the extruder is maintained substantially constant, and its thickness controlled by the speed of a horizontal endless belt conveyor onto which the vertically hanging strip is continuously discharged. A spray coating of aqueous polyvinyl alcohol, which is then dried, leaves a detackified surface without which the extrudate could not be handled.

10 Claims, 1 Drawing Sheet

PROCESS FOR EXTRUDING A PUNCTURE SEALANT AND FORMING AN ELASTOMERIC LAMINATE

BACKGROUND OF THE INVENTION

This invention relates to the continuous extrusion of a puncture sealant used in the first step of the construction of a tire carcass which, upon being cured in a conventional tire curing press, results in a self-sealing pneumatic tire. Uncured sealant is a cohesive sticky elastomeric mass which is readily deformed but will not flow even at elevated temperatures unless under pressure. After being cured, the sealant remains a cohesive and sticky elastomeric mass which is not so readily deformed and will not flow at elevated temperature and pressure unless both are relatively high. Those skilled in the art understand that puncture sealant stock, cured or uncured, refers to a highly viscous, plastic mass of rubbery adhesive which is essentially non-flowable at a temperature below about 250° F. and a pressure of about 5 psig.

More specifically, this invention relates to a process for extruding a generally flat strip of sealant from an extruder to which is supplied a stock of a sealant recipe which consists essentially of a vulcanizable ("curable") mixture of a high molecular weight (mol wt) elastomer, a low mol wt elastomer, a curing agent ("curative") and a processing aid selected from a tackifier and a homogenizer. The strip is required to be essentially uniform in thickness, less than about 10 mm thick, and at least 10 times as wide as it is thick. The curative is effective at a temperature above 250° F.

The sealant stock is taken from storage and preheated before it is supplied to the extruder as a hot plastic mass which does not flow and cannot be poured from one container to another even at 212° F. Moreover, each component of the sealant recipe strongly adheres, at ambient or elevated temperature, to any surface, and in particular each component has great adhesive affinity for the other. Yet it is essential that this stock be extruded to obtain the desired uniformly flat strip.

Further, because the strip (or, extrudate) must be of essentially uniform thickness, for best results, we have found that the sealant stock must be extruded with a screw-type extruder; and, because the rate at which the strip is discharged from the extruder is relatively sensitive to the conditions of extrusion, such as temperature of the stock, the screw speed, the internal pressure in the barrel of the extruder, etc., such minor but acceptable variations in thickness as may occur, must be controlled by the speed of the endless belt conveyor onto which the strip is continuously discharged. We have found that control of thickness by conveyor speed permits relatively speedy results. The alternative, namely changing extrusion conditions requires a relatively long time before any change in extrusion conditions produces results in the extruded flat strip.

Recognizing that a screw-type extruder is prone to cavitation if used to extrude a cohesive, non-flowable, plastic stock, it was particularly surprising that an intermittent pulsing pressure, maintained on the stock at the intake of the extruder, would overcome cavitation of the extruder and furnish a flat uniform strip of sealant.

Still further, we found it essential to coat the strip with a detackifying compound ("detackifier") or the extrudate cannot be parted from a surface onto which it is deposited; nor can a non-detackified strip be parted from another such strip on which it is placed, as it would have to be parted from preselected lengths of strips stacked for later use; or, the strip parted from itself, as when a continuous strip is rolled up as it is removed from the endless belt. Since we have found that only a polymeric alkenyl alcohol is able to provide the desired detackifying function, and it can, in practice, only be uniformly applied to the surfaces of the strip as an aqueous solution, it is essential that the water be removed before the strip is stored, or readied for use in the tire building operation.

SUMMARY OF THE INVENTION

It has been discovered that a uniformly flat strip of an elastomeric puncture sealant stock may be extruded without cavitation in a conventional screw extruder, with fine control of the extrudate, by using a reciprocating pump to feed the stock to the extruder from a heated container in which the stock is maintained under relatively low pressure, and thus maintain the stock fed to the extruder under intermittent pulsing, but high pressure.

It is therefore a general object of this invention to provide a method for continuously producing an elastomeric strip of uniformly flat sealant by extruding viscous, curative-containing, vulcanizable sealant stock which is non-flowable at a temperature below the curing temperature of the stock, in a screw-type extruder which generates relatively high pressure in its barrel, but which cavitates unless the feed to the extruder is pressurized; pressurized feed is provided by a reciprocating pump which nevertheless provides a strip of uniform thickness.

It is a specific object of this invention to provide a laminate of dual elastomeric strips, a first strip being of puncture sealant stock self-adhesively bonded (that is, without requiring an adhesive other than itself) to a second strip of inner liner stock, said sealant strip having a detackified upper surface so that it will not adhere to metal or to itself, said process comprising, (i) maintaining sealant stock, having a room temperature (75° F.) Mooney viscosity (ML/rt 1–4) in the range from above 70 to about 110, at a temperataure in the range from about 120° F. to about 250° F. in a stock container adapted to keep heated stock under a pressure in the range from about 5 to about 50 psig;

(ii) pumping said heated stock from said container with an intermittent pulsing action, to the intake of a heated screw-type extruder maintained at a temperature in the range from about 120° F. to about 250° F.;

(iii) extruding a strip of said sealant from a terminal orifice having a rectangular cross-section;

(iv) depositing said strip of sealant while hanging in a vertical plane, onto a continuous strip of inner liner stock travelling in a horizontal plane so as to bond the strip directly to the inner liner, forming said laminate;

(v) coating the surfaces of the sealant strip with an aqueous solution of a polymeric alkenyl alcohol detackifier;

(vi) removing water from the detackifier so as to dry the laminate; and, (vii) recovering the laminate coated with the detackifier.

In those instances when a laminate is not desired, but only a surface-detackfied strip of puncture sealant, it is a more specific object of this invention to extrude puncture sealant stock as a uniform strip which can be stored for later use, comprising, (i) maintaining sealant stock, having a room temperature (75° F.) Mooney viscosity (ML/rt 1–4) in the range from above 70 to about 110, at a temperature in the range from about 120° F. to about 250° F. in a stock container adapted to keep heated stock under a pressure in the range from about 5 to about 50 psig;

(ii) pumping said heated stock from said container with an intermittent pulsing action, to the intake of a heated screw-type extruder maintained at a temperature in the range from about 120° F. to about 250° F.;

(iii) extruding a strip of said sealant from a terminal orifice having a rectangular cross-section;

(iv) coating the surfaces of the strip with an aqueous solution of a polymeric alkenyl alcohol detackifier;

(v) depositing the strip on a co-continuous backing sheet;

(vi) removing water from the detackifier so as to dry the strip; and, (vii) recovering the strip coated with the detackifier.

BRIEF DESCRIPTION OF THE DRAWINGS

The foregoing and other objects and features of the present invention will be more clearly understood from the following detailed description thereof when read in conjunction with the accompanying drawings in which.

DETAILED DESCRIPTION OF PREFERRED EMBODIMENTS

Figure 1:
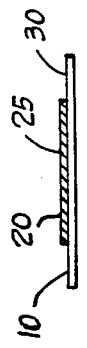
FIG. 1 is a cross-sectional elevation view diagrammatically illustrating a surface-detackified dual elastomeric laminate of a layer of puncture sealant on an elastomeric inner liner.

Referring now to FIG. 1 there is illustrated a cross sectional view of an elastomeric laminate, indicated generally by reference numeral 10 of dual first and second elastomeric strips 20 and 30. First strip 20 is an extruded strip of flat elastomeric puncture sealant, and the second strip 30 is a strip of air-impermeable inner liner, typically butyl rubber, for use in the construction of a pneumatic tire. To be useful as a sealant product in a self-sealing tire, the elastomeric laminate consists essentially of an inner liner to which is co-continuously adhesively secured a strip of a homogeneous mixture of (i) a blend of a major amount by weight of high mol wt elastomer, and a minor amount by weight of low mol wt elastomer, based on the combined weight of the high and low mol wt elastomers; (ii) at least as much processing aid, whether homogenizer or tackifier, as there is high mol wt elastomer; (iii) a curative in an amount sufficient to provide said sealant, with a room temperature (75° F.) Mooney viscosity (ML/rt 1–4) in the range from above 70 to about 110, and, when cured, with a peak Mooney viscosity at 150° F. (ML/150 1–4) below 30, preferably in the range from above about 15 but less than 30, said strip coated with a polymeric detackifier 25 in an amount sufficient to prevent adhesion of the strip to a building drum.

As the high mol wt elastomer of the sealant product, there may be employed any high mol wt elastomer capable of being crosslinked. Examples are the highly unsaturated rubbers such as those based on conjugated diolefins, whether homopolymers as in polyisoprene (particularly cispolyisoprene, whether natural or synthetic), polybutadiene (including polybutadiene of high cis content), polychloroprene (neoprene), or copolymers as exemplified by those having a major proportion of such conjugated dienes as butadiene with a minor proportion of such monoethylenically unsaturated co-polymerizable monomers as styrene or acrylonitrile. Alternatively, elastomers of low unsaturation may be used, notably butyl type rubbers (copolymers of such isoolefins as isobutylene with small amounts of conjugated dienes such as isoprene) or EPDM types (copolymers of at least two different monoolefins such as ethylene and propylene with a small amount of a non-conjugated diene such as dicyclopentadiene, 1,4-hexadiene, 5-ethylidene-2-norbornene, etc.). Even saturated elastomers such as EPM or ethylene-vinyl acetate may be employed, using the proper cure system. The elastomer may be emulsionprepared or solution-prepared, stereo specific or otherwise. The mol wt of the solid elastomer is usually in excess of 50,000 ordinarily within the range of from 60,000 to 2 to 3 million or more. Ordinarily the solid elastomeric component has a Mooney viscosity within the range of from 20 to 160 ML-4 at 212° F.

The low mol wt elastomer employed has a mol wt less than 50,000, usually within the range from 1000 to 10,000, and is preferably of the "liquid" rubber type with a maximum Brookfield viscosity at 150° F. of 2 million cps, ordinarily within the range of from 20,000 to 1 million cps. Examples are: liquid cis-polyisoprene (e.g. heat depolymerized natural rubber, or cis-polyisoprene polymerized to low mol wt), liquid polybutadiene, liquid polybutene, liquid EPDM, and liquid butyl rubber.

The homogenizing agents (homogenizers) used are low mol wt polymeric resin blends which assist the high and low mol wt elastomeric components to form a homogeneous, uniform, processable mass. The homogenizers are available as semi-solid low melting point resins, having varaying polarities, in block or friable flake form. The homogenizer is compatible with aliphatic, naphthenic and aromatic portions of the elastomers in a blend. Commercially available homogenizers are Struktol ® 40MS and Struktol NS, inter alia. Each homogenizer may be used in conjunction with a plasticizer to lower the viscosity or soften the elastomer.

The tackifier is preferably a low mol wt material such as a rosin ester (e.g. Staybelite® Ester 10; aliphatic petroleum hydrocarbon resins (e.g. Piccopale ® A-70 and 100S); polyterpene resins derived from alpha-pinene (e.g. Piccolyte ® A-10), beta-pinene (e.g. Piccolyte S-25); resins made from styrene and related monmers (e.g. Piccolastic ® A-5); resins made from dicyclopentadiene (e.g. Piccodiene ® 2215); and resins from the reaction of a mineral oil purification residue with formaldehyde and with nitric acid catalyst according to U.S. Pat. No. 3,544,494 sold under the Struktol trademark).

The sealant recipe includes a sufficient quantity of a curing agent, effective under curing press conditions, so that upon curing, the sealant in the tire is crosslinked to essentially the extent dictated by the curing agent present. Suitable curing agents are:

1. Sulfur curing systems such as those based on sulfur or sulfur-yielding materials (e.g. tetramethyl thiuram disulfide) and conventional accelerators of sulfur vulcanization.
2. Quinoid curing systems such as p-quinone dioxime (GMF®, from Uniroyal Chemical) with or without supplementary oxidant.
3. Organic peroxides or hydroperoxides (together referred to as "(hydro)peroxides" for brevity) are free radical generating catalysts such as dicumyl peroxide, cumene hydroperoxide, methyl ethyl ketone hydroperoxide or other free radical generating catalysts such as azobisisobutyronitrile. nitrile.
4. Polyisocyanates such as MDI (4,4'-methylene bisphenyleneisocyanate), TDI (toluene diisocyanate), and PAPI (polymethylene polyphenylisocyanate) as well as dimers and trimers of MDI and TDI.

The amount of curing agent used will vary with the elastomers employed and with their proportions, as well as with the structure of the curing agent, and conditions under which it is used. The amount used is sufficient to prevent significant flow of the sealant in a tire at temperatures up to 200° F. and vehicle speeds up to 70 mph, while still retaining sufficient adhesiveness and conformability to perform the described sealant function. The more the high mol wt elastomer, generally the less curing agent required. For a depolymerized natural rubber (DPR) natural rubber (NR) mixture, the amount of sulfur containing or quinoid type curing agent will be in the range of from more than 0.5 to 2.0 phr (parts per 100 parts by wt of both elastomers added together), ordinarily from 0.7 to 1.5 phr. For the same mixture, with a polyisocyanate curing agent, the amount required will range from 2 to 10 phr, preferably 2.5 to 8 phr. The applicable range for (hydro)peroxide would be 0.1 to 1.0 phr, preferably 0.2 to 0.7 phr, and the (hydro)peroxides are most preferred. Whichever curative is used, it is essential that the amount used provide the sealant product with a cured ML-peak/150° F. which is in the range from above about 15 but below 30.

(Hydro)peroxides include aromatic or aliphatic (hydro)peroxides, for example the diacyl peroxides, dibasic acid peroxides, ketone peroxides, and alkyl peroxyesters or hydroperoxides; in particular, diacetyl peroxide; dibenzoylperoxide; bis-2,4-dichlorobenzoyl peroxide; ditert-buytlperoxide; dicumylperoxide; tertbutylperbenzoate; tert-butylcumylperoxide; 2,5-bis(tert-butylperoxy)-2,5-dimethylhexane; 2,5-bis(butylperoxy)2,5-dimethylhexyne-3; 4,4',4'-tetra(tert-butylperoxy)-2,2dicyclohexylpropane; 1,4-bis(tert-butylperoxy-isopropyl)benzene; 1,1-bis(tert-butylperoxy)3,3,5-trimethylcyclohexane; lauroyl peroxide; succinic acid peroxide; cyclohexanone peroxide; tert-butylperacetate; butyl hydroperoxide; and the like.

The amount of (hydro)peroxide used is preferably from 0.8 to 3.0 millimoles (mmol), more preferably from 0.9-2.6 mmol per 100 g of high mol wt elastomer. Specifically with dicumyl peroxide, from 1.4-2.4 mmol/100 g maintains a ML-peak/150° F. in the range from 15 to less than 30, preferably 17-28, most preferably 18-25.

It is desirable to add an antioxidant, antiozonant or other stabilizer in the sealant recipe, but it is not desirable to add a pigment such as carbon black, or any particulate inorganic fillers or extenders, all of which tend to denigrate the efficacy of the sealant; neither is it desirable nor necessary to add fibrous fillers to the sealant composition because these adversely affect the control of viscosity in the necessary range.

The necessary viscosity of the sealant, before and after curing, is maintained by ensuring that there is always more than 50 parts of high mol wt elastomer per 100 parts by wt of combined high and low mol wt elastomers, and preferably twice as much high as low mol wt elastomer in the recipe; further, by ensuring that there is more processing aid, selected from a homogenizer and a tackifier, than there is high mol wt elastomer. Most preferably the viscosity of a recipe containing a major amount of high mol wt elastomer is controlled with the presence of both, a homogenizer and a tackifier. With a Struktol-MS type homogenizer it is preferred that there be at least twice as much homogenizer than tackifier; and, that the combined wt of homogenizer and tackifier is at least equal to that of the high mol wt elastomer.

The precise ratio of the high to low mol wt elastomers depends mainly on the mol wt of the high mol wt elastomer and other variables such as the particular elastomer involved, the amount and kind of crosslinking agent used, and the conditions for curing the green tire. The ratio of high to low mol wt is preferably chosen so as to give a ML/rt 1-4 above 70, preferably from about 90 to about 110 for the sealant recipe, before it is delivered to the extruder.

The ratio of high mol wt: low mol wt elastomers is always greater than 1, but may range as high as 10 to 1. A preferred ratio is from greater than 1 to about 5, and most preferred is in the range from 2 to about 4.

The ML/rt viscosity, reached at the 4 min Mooney, preferably ranges from 95 to about 105. The viscosity of the extrudate when cooled to room temperature is essentially the same as that of the unextruded recipe indicating there is substantially no crosslinking of the sealant after it is extruded.

In practicing the invention, the ingredients are mixed together uniformly in a sigma-bladed Guittard Mixtruder, or the like, where the components of the sealant recipe are added directly to a container from which they are to be later pumped to an extruder, as will be explained.

Upper surface 21 of the sealant strip 20 is coated with a dry detackifier 25 which is sprayed onto the surface of the laminate as an aqueous solution (as will be explained in greater detail hereinafter). The detackified upper surface permits the sealant strip to be rolled upon itself, or cut to predetermined lengths and stacked, as it is removed for temporary storage prior to use in the construction of a self-sealing pneumatic tire.

Figure 2:
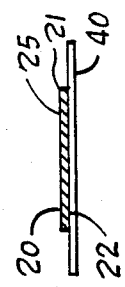
FIG. 2 is a cross-sectional elevation view diagrammatically illustrating a surface-detackified layer of puncture sealant on a polyolefin backing sheet.

In those instances where a laminate is not required, that is, the strip is desired without the inner liner, both the upper and lower surfaces 21 and 22 of the strip, illustrated in FIG. 2, are coated with detackfier 25 so that the strip does not adhere to backing sheet 40 onto which the strip 20 is extruded. For use at a later time, the strip, which is precut to a predetermined length to encircle a tire building drum (not shown), is parted from the backing sheet and the strip is wrapped around the building drum, in a conventional first step of tire construction. The detackifier on the upper surface 21 of the strip is then wiped or washed away with a solvent and a strip of inner liner, also precut to predetermined length to encircle the sealant strip on the building drum, is wrapped around the sealant strip on the drum and is adhesively secured to the strip. Because the detackifier remains on the lower surface of the strip in contact with the building drum, the tire, when completed, may be removed from the drum to which the tire would otherwise be tightly adhered.

Figure 3:
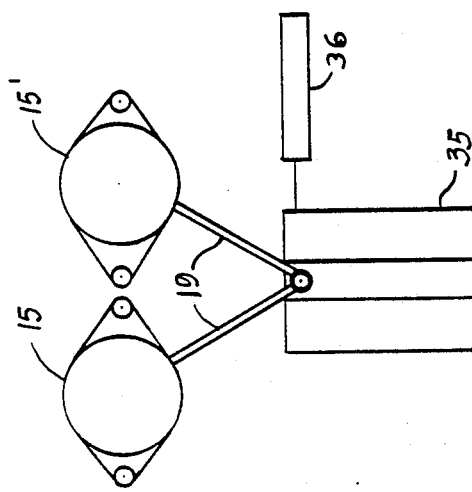
FIG. 3 is a schematic illustration of apparatus used for extrusion, laminating and drying operations in a process for producing a laminate of dual elastomers, a first sealant strip and a second inner liner strip.

Referring now to FIG. 3 there is shown a conventional jacketed screw extruder 35 having the usual controls 36 for operating the extruder at conditions adapted to produce a uniform extrudate. These controls include a pressure control, a control for the rate of rotation of the screw, a thermocouple and control means to maintain a preselected elevated temperature in the jacket, and controls for the rate of flow of the heating fluid in the extruder's jacket, all of which are conventional.

Figure 4:
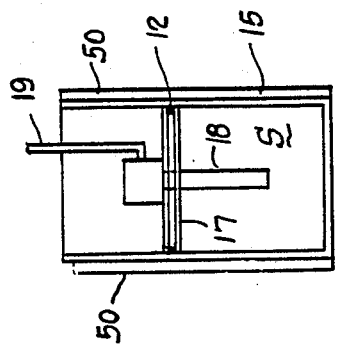
FIG. 4 is a detailed crossectional elevation view of sealant stock in a drum from which it is pumped with a reciprocating pump, so that stock is delivered to the feed hopper of the extruder under pulsating high pressure.

Though the extruder is to be operated continuously, sealant stock S is supplied to it in at least one heated cylindrical drum 15 which can be quickly replaced with a fresh one when emptied, or more preferably, in twin such drums 15 and 15' which may be used one after the other. The temperature of the drums is maintained below the curing temperature of the curative, preferably in the range from about 150° F. to about 250° F., in which range the sealant will flow under pressure of from 5–50 psig exerted by a weighted disc or piston 17 (see FIG. 4) slidably engaged within the bore of the drum. Alternatively, the piston may be provided with a hydraulically powered shaft (not shown) adapted to exert controlled pressure on the surface of sealant in the drum which pressure is sufficient to produce the flow necessary to fill the chamber of a reciprocating pump 18 on each of its pumping strokes.

The piston is fitted with a circumferential seal to ensure the desired pressure-tight fit. The reciprocating pump 18 is mounted in the piston and the pump is inserted in the hot sealant. The discharge line 19 from the pump is traced with heating tape to maintain the temperature of the sealant the same as in the drum. The discharge line is in fluid-tight communication with the feed hopper of the extruder 35 maintaining the sealant therein under pressure in the range from about 1000–5000 psig exerted by the pump. The reciprocating pump exerts intermittent pressure as the chamber of the pump is filled and emptied on each stroke. This intermittent pumping action is thought to be instrumental and critical to prevent cavitation of the extruder fed with the hot sealant stock.

Each drum is heated by a heating jacket 50 removably disposed around the drum's entire circumferential area. The jacket is supplied with steam under pressure, or with electrical heating elements adapted to maintain the sealant stock in the stated temperature range.

The extruder is provided with a terminal outlet fitted with a die assembly 37 having a downwardly facing rectangular orifice the length of which corresponds approximately to the width of the sealant strip to be extruded, and the width of which orifice corresponds approximately to the thickness of the strip.

The inner liner 30 is let off from a roll 32 of inner liner stock at the head of an endless belt conveyor 45 upon which the liner stock is carried under and past the extruder's die assembly. The strip thus falls in the vertical plane onto the inner liner as it travels in the horizontal plane on the endless belt conveyor, and the strip becomes immediately adhered to the inner liner, resulting in the laminate. The conveyor 45 is provided with a conventional speed control which determines the speed of the conveyor which in turn determines the thickness of the sealant strip deposited on the inner liner.

Soon thereafter the surface of the laminate is sprayed with an aqueous solution of poly(vinyl alcohol) (PVA) or other polymeric detackifier which is discharged from spray means 39. The concentration of PVA is sufficient to provide a detackified surface when it is dry. To dry the sealant's surface, the wet detackfied laminate is passed into a drying means 43, preferably a convection oven with forced air circulation at a temperature below the curing temperature of the curative in the sealant, for a time long enough to dry the surface. The detackified surface of the dried laminate allows it to be taken up in a take-up roll 47 of continuous essentially uncrosslinked laminate at the tail end of the endless belt conveyor 45. Preselected lengths of the laminate are then used for the construction of self-sealing pneumatic tires as described in copending application Ser. No. 080842 of Hong and Cangelosi filed Aug. 3, 1987.

For ease of handling the laminate, it is desirable to provide a take-up roll 47 of backing sheet 40 from a backing sheet let off 42 near the head end of the endless belt conveyor, preferably immediately below the let off roll 32 for the inner liner strip, to feed the backing sheet continuously at the same rate as the inner liner, which rate is determined by the speed of the conveyor 45.

The use of a polymer backing sheet, for example of polyolefin, is particularly advantageous in those instances where the sealant strip is to be extruded by itself, that is, without bonding it to another strip such as an inner liner. In such instances, the backing sheet is passed through a bath of an aqueous solution of PVA detackifier as soon as it is let off at the head of the endless belt conveyor. The extruded strip is then deposited on the wet backing sheet so that they can later be parted. The spray means then sprays the upper surface of the sealant strip with detackfier solution and the thoroughly detackified sheet is passed into the convection oven 43 to remove the water, as before. The dried sealant strip on the backing sheet is then rolled up for storage and later use. Predetermined lengths of the laminate are then cut from the roll, depending upon the size of the tires to be built.

The following examples will serve to illustrate the practice of the invention in greater detail.

EXAMPE 1

A laminate of sealant and inner liner, for use in building a green tire, is prepared as follows:

A sealant stock containing 62 parts of natural rubber (NR), 43 parts depolymerized rubber DPR-400, 64 parts Struktol MS homogenizer, and 21 parts Piccopale 100SF tackifier, was blended with 0.5 parts stabilizer; then, 0.5 parts dicumylperoxide in a 40% concentration were added. The NR is a 25/75 parts mixture of standard Malaysian rubbers having 60 ML-4 @ 211° F. and 80–110 ML-4 @ 212° F. respectively. The viscosity of the DPR-400 is 80,000 cp at 150° F. (66° C.). The stabilizer is a mixture of 40% distearylthiodipropionate, 20% blend of substituted phenylenediamine antiozonants, 20% nonylated phenylphosphite antioxidant, and 20% thiodiethylenebis(3,5-di-t-butyl-4-hydrophenylpropionate) antioxidant.

This hot sealant mixture is pumped with an airpowered Graco reciprocating pump P-207566 Plate No. 172451 series 5A, having a 55:1 output pressure, from a heated drum kept at about 150° F. Thus the pressure of sealant in the discharge line is controlled by the air pressure to the pump. Desirably the discharge pressure is in the range from 500 – 5000 psi. The reciprocating action of the pump maintains intermittent pressure on the sealant in the feed hopper of a 4.5" tuber fitted with a variable speed motor to change the speed of the single screw extruder made by National Rubber Machine Co. The temperature of sealant in the cylindrical barrel of the extruder is about 150° F. The extruder is fitted with a die assembly having a rectangular orifice about 0.35" in width and about 9" long, so that the extruded strip is deposited on an inner liner moving at a speed of about 1 ft/sec under the orifice to produce a sealant strip about 0.33" thick and 9"wide laminated to an inner liner strip about 0.0625" thick and 12" wide. The die assembly may be heated and fitted with a temperature sensing means to monitor the temperature of sealant flowing therethrough.

The exposed surface of the sealant strip is sprayed with a 5% aqueous solution of PVA and the wet laminate is dried in an oven at 250° F. and recovered. The laminate is found to be essentially free of crosslinks as determined by the gel content in toluene at room temperature (75° F.).

EXAMPLE 2

The sealant stock used in Example 1 hereinabove is extruded, as before, to produce an essentially uncrosslinked self-supporting sealant strip, that is, not requiring the support of the inner liner as in the laminate, with the strip's upper and lower surfaces detackified, is prepared a follows:

A roll of polyethylene backing sheet is substituted for the inner liner roll at the head of the endless belt conveyor. The backing sheet is let off into a bath of PVA solution before the sheet is placed on the belt of the endless belt conveyor, at its head. The extrudate falls vertically onto the wetted sheet travelling horizontally under the die assembly, and then under the spray 39 of PVA solution before it is dried in the dryer 43. The dried sealant strip is then rolled up with the co-continuous backing sheet which does not adhere to the strip.

EXAMPLE 3

In a manner analogous to that described in example 2 hereinabove, a sealant stock recipe contains 60 parts of polychloroprene, 40 parts liquid acrylonitrile, 64 parts Struktol MS homogenizer, and 21 parts Piccopale 100SF tackifier, blended with 0.5 parts stabilizer; then, 1 part of zinc oxide and 1 part of magnesium oxide are added. The mixture is extruded as before, deposited on a backing sheet dipped in PVA solution, and spray-coated with the PVA aqueous solution.

EXAMPLE 4

In a manner analogous to that described in example 1 hereinabove, a sealant stock recipe contains 65 parts of halobutyl rubber, 45 parts depolymerized rubber (DPR-400), 64 parts Struktol MS homogenizer, and 21 parts Piccopale 100SF tackifier, blended with 0.5 parts stabilizer; then, 0.5 parts dicumyl peroxide is added. The mixture is extruded as before, deposited on a backing sheet dipped in PVA solution, and spray-coated with the PVA aqueous solution.

In the foregoing examples, a vertically hanging strip is deposited on the horizontally moving conveyor in a thickness preferably 0.250 inch thick, with a variation of no more than +0.030 inch, and typically less than +0.020 inch so that the effect of pulses of the pump are barely visible.

We claim:

1. A process for producing an elastomeric laminate of an essentially uncrosslinked highly viscous and adhesive puncture sealant strip and an inner liner, which laminate can be recovered for use at a later time for the construction of a self-sealing pneumatic tire, said process comprising,
   (i) maintaining sealant stock, having a 75° F. room temperature Mooney viscosity (ML/rt 1-4) in the range from above 70 to about 110, at a temperataure in the range from about 120° F. to about 250° F. in a stock container adapted to keep heated stock under a pressure in the range from about 5 to about 50 psig;
   (ii) pumping said heated stock from said container with an intermittent pulsing action, to the intake of a heated screw-type extruder maintained at a temperature in the range from about 120° F. to about 250° F.;
   (iii) extruding a strip of said sealant from a terminal orifice having an essentially rectangular cross-section;
   (iv) depositing said strip of sealant hanging in a vertical plane onto a continuous strip of inner liner stock travelling in a horizontal plane so as to bond a strip having essentially uniform thickness directly to said stock, forming said laminate;
   (v) coating the surfaces of the sealant strip with an aqueous solution of a polymeric alkenyl alcohol detackifier;
   (vi) removing water from the detackifier so as to dry said laminate; and,
   (vii) recovering said laminate coated with the detackifier.

2. The process of claim 1 wherein said sealant stock consists essentially of a homogeneous mixture of
   (i) a blend of a major amount by weight of high molecular weight elastomer, and a minor amount by weight of low molecular weight elastomer, based on the combined weight of the high and low molecular weight elastomers;
   (ii) at least as much processing aid as there is high molecular weight elastomer; and, (iii) a curative in an amount sufficient to provide said sealant, with said Mooney viscosity.

3. The process of claim 2 wherein said high molecular weight stock consists essentially of highly unsaturated rubbers including those based on conjugated diolefin polymers selected from the group consisting of polyisoprene, polybutadiene, polychloroprene, and copolymers having a major proportion of a conjugated diene with a minor proportion of a monoethylenically unsaturated copolymerizable monomer.

4. The process of claim 2 wherein pumping said stock to the extruder is effected at a discharge pressure in the range from about 1000–5000 psig.

5. The process of claim 4 wherein said polymeric alkenyl alcohol is poly(vinyl alcohol) having an average molecular weight in the range from about 25,000 to about 300,000.

6. A process for producing an elastomeric essentially uncrosslinked highly viscous and adhesive puncture sealant strip for use in the construction of a self-sealing pneumatic tire, said process comprising, (i) maintaining sealant stock, having a room temperature Mooney viscosity (ML/rt 1-4) in the range from above 70 to about 110, at a temperataure in the range from about 120° F. to about 250° F. in a stock container adapted to keep heated stock under a pressure in the range from about 5 to about 50 psig;

(ii) pumping said heated stock from said container with an intermittent pulsing action, to the intake of a heated screw-type extruder maintained at a temperature in the range from about 120° F. to about 250° F.;

(iii) extruding a strip of said sealant from a terminal orifice having an essentially rectangular cross-section;

(iv) coating the surfaces of the strip with an aqueous solution of a polymeric alkenyl alcohol detackifier;

(v) depositing said strip having an essentially uniform thickness on a co-continuous backing sheet;

(vi) removing water from the detackifier so as to dry said strip; and, (vii) recovering said strip coated with the detackifier.

7. The process of claim 6 wherein said sealant stock consists essentially of a homogeneous mixture of (i) a blend of a major amount by weight of high molecular weight elastomer, and a minor amount by weight of low molecular weight elastomer, based on the combined weight of the high and low molecular weight elastomers;

(ii) at least as much processing aid as there is high molecular weight elastomer; and, (iii) a curative in an amount sufficient to provide said sealant, with said Mooney viscosity.

8. The process of claim 7 wherein said high molecular weight stock consists essentially of highly unsaturated rubbers including those based on conjugated diolefin polymers selected from polyisoprene, polybutadiene, polychloroprene, and copolymers having a major proportion of a conjugated diene with a minor proportion of a monoethylenically unsaturated copolymerizable monomer.

9. The process of claim 8 wherein pumping said stock to the extruder is effected at a discharge pressure in the range from about 1000-5000 psig.

10. The process of claim 9 wherein said polymeric alkenyl alcohol is poly(vinyl alcohol) having an average molecular weight in the range from about 25,000 to about 300,000.

* * * * *